(12) United States Patent
Kim et al.

(10) Patent No.: US 8,725,719 B2
(45) Date of Patent: May 13, 2014

(54) MANAGING WEB PAGE LINKS USING STRUCTURED DATA

(75) Inventors: Jane T. Kim, Seattle, WA (US); Walter VonKoch, Seattle, WA (US); Sean O. Lyndersay, Redmond, WA (US); Benjamin N. Truelove, Lynnwood, WA (US); Miladin Pavlicic, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 11/706,611

(22) Filed: Feb. 13, 2007

(65) Prior Publication Data

US 2008/0195674 A1     Aug. 14, 2008

(51) Int. Cl.
*G06F 17/30* (2006.01)

(52) U.S. Cl.
USPC .......................................... 707/709; 707/710

(58) Field of Classification Search
None
See application file for complete search history.

(56) References Cited

U.S. PATENT DOCUMENTS

| | | | |
|---|---|---|---|
| 5,860,071 A | 1/1999 | Ball et al. | |
| 5,918,237 A | 6/1999 | Montalbano | |
| 5,963,964 A | 10/1999 | Nielsen | |
| 6,029,175 A | 2/2000 | Chow et al. | |
| 6,041,360 A | 3/2000 | Himmel et al. | |
| 6,219,676 B1 | 4/2001 | Reiner | |
| 6,219,679 B1 | 4/2001 | Brisebois et al. | |
| 6,480,852 B1 | 11/2002 | Himmel et al. | |
| 6,535,912 B1 | 3/2003 | Anupam et al. | |
| 6,631,496 B1 | 10/2003 | Li et al. | |
| 6,834,306 B1 | 12/2004 | Tsimelzon | |
| 6,842,774 B1 * | 1/2005 | Piccioni | 709/207 |
| 6,961,751 B1 | 11/2005 | Bates et al. | |
| 7,028,032 B1 | 4/2006 | Diedrich et al. | |
| 7,051,117 B2 | 5/2006 | McGee et al. | |
| 7,089,305 B2 | 8/2006 | Bates et al. | |
| 8,037,527 B2 | 10/2011 | Milener et al. | |

(Continued)

FOREIGN PATENT DOCUMENTS

| | | |
|---|---|---|
| CN | 101617336 | 12/2009 |
| JP | 11296428 | 10/1999 |

(Continued)

OTHER PUBLICATIONS

Arasu et al. (Proceedings of the 19th International Conference on Data Engineering (ICDE'03), Jun. 9-12, 2003, San Diego, CA).*

(Continued)

*Primary Examiner* — Anteneh Girma
(74) *Attorney, Agent, or Firm* — Andrew Sanders; Micky Minhas

(57) ABSTRACT

In accordance with certain embodiments, requests to collect structured data in a web page and to subscribe to that structured data are received. This structured data is stored in a data store to allow offline use of the structured data. In accordance with other embodiments, a computing device displays multiple links each of which identifies a different one of multiple web pages. Additionally, the multiple pages include structured data. The display of these multiple links is altered as the computing device detects changes to the structured data in the web pages. In accordance with other embodiments, a web page includes structured data that has been subscribed to. The computing device detects changes to the web page, and notifies a user of a change to the web page only if the change is a change to the structured data and not a change to other portions of the web page.

20 Claims, 9 Drawing Sheets

(56) References Cited

U.S. PATENT DOCUMENTS

| | | | |
|---|---|---|---|
| 2004/0090472 A1 | 5/2004 | Risch et al. | |
| 2004/0117479 A1* | 6/2004 | Jellum et al. | 709/224 |
| 2004/0189696 A1 | 9/2004 | Shirriff | |
| 2006/0080405 A1 | 4/2006 | Gibson | |
| 2006/0101514 A1* | 5/2006 | Milener et al. | 726/22 |
| 2006/0253423 A1* | 11/2006 | McLane et al. | 707/2 |
| 2008/0195674 A1 | 8/2008 | Kim | |

FOREIGN PATENT DOCUMENTS

| | | |
|---|---|---|
| JP | 2003050824 | 2/2003 |
| JP | 2003281093 | 10/2003 |
| JP | 2004070441 | 3/2004 |
| JP | 2005100106 | 4/2005 |
| JP | 2005234876 | 9/2005 |
| TW | 200841244 | 10/2008 |

OTHER PUBLICATIONS

Bill Burcham,"Baby Steps to Synergistic Web Apps",Date:Oct. 2005, http://lesscode.org/2005/10/21/baby-steps-to-synergistic-web-apps/.
Jon Udell,"Dueling simplisities",Date:Nov. 2005, http://weblog.infoworld.com/udell/2005/11/22.html.
Jack Ozzie,et al."XML Developer Center: Simple Sharing Extensions for RSS and OPML",Date:Dec. 2006,http://msdn.microsoft.com/xml/rss/sse/.
"Page XML Developer Center: Frequently Asked Questions for Simple Sharing Extensions (SSE) e 1 of 4",http://msdn.microsoft.com/xml/rss/ssefaq/.
Bill Burcham,"Half a Baby Step",Date:Nov. 2, 2005,http://lesscode.org/2005/11/02/half-a-baby-step/.
Live Clipboard Example.
Ray Ozzie,"Live Clipboard".
Live Clipboard Screencasts,http://spaces.live.com/editorial/rayozzie/demo/liveclip/screencast/liveclipdemo.html.
"Live Clipboard Technical Introduction",http://spaces.live.com/editorial/rayozzie/demo/liveclip/liveclipsample/techPreview.html.
Jack Ozzie,et al.,"Live Clipboard",Date:Apr. 2006,http://spaces.live.com/editorial/rayozzie/demo/liveclip/specification/v092.html.
MacLean et al.,"Microsoft Team RSS Blog",http://blogs.msdn.com/rssteam/archive/2005/12/07/501326.aspx.
Bill Burcham,"Ray Ozzie Demos Web App Clipboard",Date:Mar. 2006,http://www.memerocket.com/2006/03/21/ray-ozzie-demos-web-app-clipboard/.
Ray Ozzie,"Really Simple Sharing" Date: Nov. 20.
Bill Burcham,"Ray Ozzie Got the Memo",Date:Mar. 2006,http://lesscode.org/2006/03/22/ray-ozzie-got-the-memo/.
Microsoft Team RSS Blog : Simple Sharing Extensions for RSS and OPML,http://blogs.msdn.com/rssteam/archive/2005/12/01/498704.aspx.
"Simple Sharing Extensions up close . . . ",http://kinrowan.net/blog/wp/archives/2005/11/23/sse-up-close.
"Microsoft Team RSS Blog",http://blogs.msdn.com/rssteam/archive/2006/01/25/517473.aspx.
eZine Approach Understanding OLE.
Ray Ozzie,"Wiring Progress . . . ".
Ray Ozzie,"Wiring the Web".
"Zimbra—Blog—A Pint of ALE—Ajax Linking and Embedding",http://wvvvv.zimbra.com/blog/archives/2006/04/zimbra_ale-ajax_linking_and_embedding . . . .
"Zotero—The Next-Generation Research Tool",http://www.zotero.org/.
"Mozilla Corporation",https://addons.mozilla.org/firefox/4106/.
"Mozilla Corporation",https://addons.mozilla.org/firefox/748/.
"Introducing Operator",http://labs.mozilla.com/2006/12/introducing-operator.
"Kaboodle Get Started",http://www.kaboodle.com/zd/help/getStarted.html.
Clipboard.

Hinchcliffe,"Page How Simple Sharing Extensions Will Change the Web (Dion Hinchcliffe's Web 2.0 Blog) e 1 of 10",http://web2.wsj2.com/how_simple_sharing_extensions_will_change_the_web.htm.
Dare Obasanjo aka Carnage4Life—Metadata Quality, Events Databases and Live Clipboard,http://www.25hoursaday.com/weblog/PermaLink.aspx?guid=91e40df6-c973-4bf7-8eb6-0 . . . Dec. 14, 2006.
"EP Search Report", Application No. 08729587.9, (Mar. 15, 2010), 7 pages.
Liu, L et al., "WebCQ—Detecting and Delivering Information Changes on the Web", *Proceedings of the Ninth International Conference on Information and Knowledge Management*, (Nov. 2000), pp. 512-519.
McConnell, John "Getting More Out of the Worldwide Web", *The Lancet*, vol. 351, (Mar. 1998), pp. S3-S4.
"Foreign Office Action", European Patent Application 08729587.9, (May 25, 2010),5 pages.
"PCT International Search Report", Application No. PCT/US2008/053644, (Jun. 3, 2008),3 pages.
"Final Office Action", U.S. Appl. No. 11/706,611, (Nov. 5, 2009),14 pages.
"Non Final Office Action", U.S. Appl. No. 11/706,611, (Mar. 5, 2009),13 pages.
Faaborg, Alex "Mozilla Labs Blog: Introducing Operator", Retrieved from: <http://labs.mozilla.com/2006/12/introducing-operator> on Jun. 4, 2007, (Dec. 16, 2006), 16 pages.
Moromisato, George "Microsoft Team RSS Blog—More on SSE", Retrieved from:<http://blogs.msdn.com/rssteam/archive/2005/12/07/501326.aspx> on Jun. 5, 2007, (Dec. 7, 2005),2 pages.
Ozzie, Ray "Real Simple Sharing", (Nov. 20, 2005),4 pages.
Ozzie, Ray "Wiring Progress", (Apr. 1, 2006),3 pages.
"Foreign Office Action", Chinese Application No. 200880004713.8, (Jul. 8, 2011),12 pages.
"Foreign Office Action", Mexican Application No. MX/a/2009/008501, (Mar. 28, 2012),7 pages.
"Foreign Office Action", Chinese Application No. 200880004713.8, (Dec. 6, 2012), 11 pages.
"Foreign Office Action", Israel Application No. 199934, (Sep. 23, 2012), 6 pages.
"Foreign Office Action", Chinese Application No. 200880004713.8, (Mar. 22, 2013), 9 pages.
"A True NEET Who Woke Up with the 'Absolute Territory' (zettai ryoiki in Japanese) Becomes a Rich, Find a Way Out of NEET", NetRunner, vol. 7, No. 7,(Jul. 1, 2005),pp. 132-137.
"Foreign Office Action", Chinese Application No. 200880004713.8, (May 14, 2012), 8 pages.
"Foreign Office Action", Japanese Application No. 2009-549682, (Mar. 9, 2012),12 pages.
"Foreign Office Action", Russian Application No. 2009130804, (Feb. 1, 2012),8 pages.
"Internet Update Checker "Mierudegozaru"", Retrieved from: <http://www.vector.co.jp/soft/dl/win95/net/se321973.html> on Feb. 28, 2012,(Oct. 7, 2004),11 pages.
"Master Five Points: Download, Search, Security, Block Advertisement and Spam, Steps to Hackers, Completely Master Back Tools", PC Japan, vol. 9, No. 1,(Jan. 1, 2004),pp. 50-55.
"Services for Microformats", Retrieved from: <http://2xup.org/log/2006/04/21-2154> on Feb. 28, 2012,(Apr. 21, 2006),4 pages.
Hume, Andy "Greasemonkey and Microformats", Retrieved from: <http://george.hotelling.net/90percent/geekery/greasemonkey_and_microformats.php> on Feb. 28, 2012,(Jul. 28, 2005),2 pages.
Oguro, Naoaki "How to Use Applications", Oshiete DOS/V Special, ASCII DOS/V Issue, vol. 3, No. 11, Japan ASCII Corporation, Japan-,(Nov. 1, 1997),pp. 222-223.
"Foreign Office Action", Chinese Application No. 200880004713.8, (Aug. 19, 2013), 10 Pages.
"Foreign Office Action", Mexican Application No. MX/a/2009/008501, (Jun. 2, 2013), 5 pages.
"Foreign Office Action", Taiwan Application No. 097103313, (Oct. 23, 2013),17 pages.
"Foreign Office Action", Israel Application No. 199934, (Aug. 5, 2013), 7 pages.

(56) References Cited

OTHER PUBLICATIONS

Douglis, et al., "Tracking and Viewing Changes on theWeb", Date: 1996, http://www.research.ibm.com/people/f/fdouglis/papers/aide-usenix96.pdf.

Roberts, et al., "Making Favorites Useful", http://cs.ucsb.edu/~jrob/publications/Bookm_IASTED_HCI_05.pdf.

"Foreign Office Action", CN Application No. 201110378096.1, Dec. 25, 2013, 12 Pages.

"Foreign Notice of Allowance", TW Application No. 97103313, Jan. 29, 2014, 4 Pages.

Kaasten, et al.,' "Designing an Integrated Bookmark/History System for Web Browsing", Proceedings of the Western Computer Graphics Symposium 2000, Available at: <http://grouplab.cpsc.ucalgary.ca/papers/2000/00-GrouplabPapers.Skigraph/kaasten.pdf>,Mar. 2000, 4 pages.

Kirkpatrick, "BlueOrganizer 3.0: Instant Vertical Search and Tagging", Retrieved from: <http://techcrunch.com/2006/11/20/blueorganizer-launches-powerful-contextual-sear> on Dec. 8, 2006, Nov. 20, 2006, 12 pages.

* cited by examiner

MANAGING WEB PAGE LINKS USING STRUCTURED DATA

BACKGROUND

The Internet and the world wide web (the web) are becoming an integral part of our daily lives, being used for work, entertainment, research, and so on. Oftentimes, users create a list of favorite or bookmarked web pages that they access frequently. These web pages can be easily re-accessed by the user by selecting them from the list. However, these web pages can change over time. Typically, in order for the user to monitor changes to the web pages, he or she needs to manually re-access the web pages to see if there are any changes. Such re-accessing can be time consuming and burdensome on the user. Other techniques that allow users to monitor changes to the web pages include having the servers hosting the web pages email notifications of changes to the user, or having the servers hosting the web pages install desktop plug-ins on the user's computer that monitor the content on the web pages. However, such techniques require a significant amount of work on the part of the developers of and/or servers hosting the web pages, and typically provide the user with a different experience for each web page. Accordingly, it would be beneficial to have an improved way for notifying users of changes to web pages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of managing web page links using structured data, requests to collect structured data in a web page and to subscribe to that structured data are received. This structured data is stored in a data store to allow offline use of the structured data.

In accordance with one or more other aspects of managing web page links using structured data, a computing device displays multiple links each of which identifies a different one of multiple web pages. Additionally, the multiple pages include structured data. The display of these multiple links is altered as the computing device detects changes to the structured data in the web pages.

In accordance with one or more other aspects of managing web page links using structured data, a web page includes structured data that has been subscribed to. A computing device detects changes to the web page, and notifies a user of a change to the web page only if the change is a change to the structured data and not a change to other portions of the web page.

BRIEF DESCRIPTION OF THE DRAWINGS

The same numbers are used throughout the drawings to reference like features.

DETAILED DESCRIPTION

Managing web page links using structured data is discussed herein. Users can select structured data to be collected from different web pages and have the web pages that include that structured data stored for offline use. Additionally, the user can subscribe to changes to the structured data, so that whenever the structured data is changed the user is notified of the change. A user interface notifies the user of changes to the structured data, and further allows the user to preview those changes prior to the user navigating to the web page.

Figure 1:
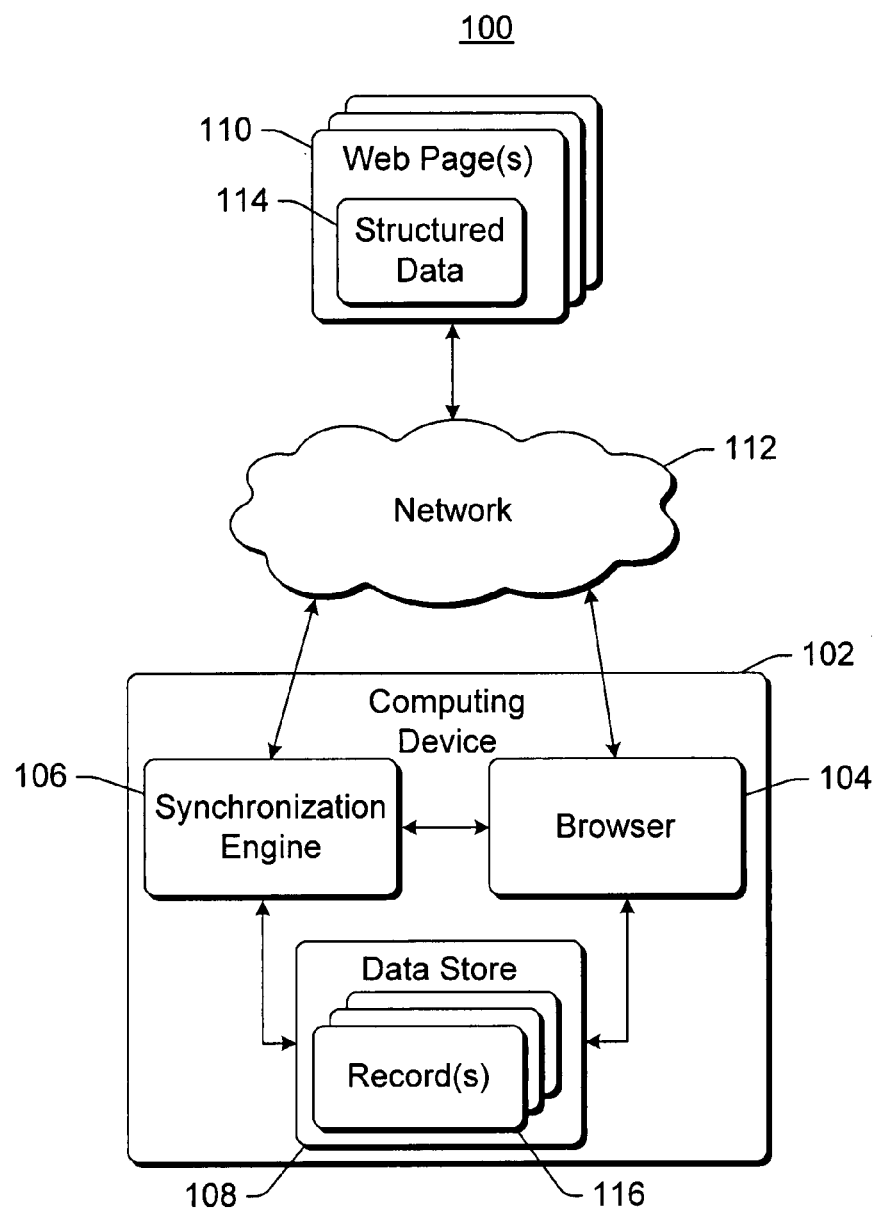
FIG. 1 illustrates an example system in which the managing web page links using structured data can be used in accordance one or more embodiments.

FIG. 1 illustrates an example system 100 in which the managing web page links using structured data can be used. System 100 includes a computing device 102 having a web browser 104, a synchronization engine 106, and a data store 108. Computing device 102 accesses web pages 110 over a network 112. Computing device 102 can be any of a variety of different computing devices, such as a desktop computer, handheld computer, laptop computer, server computer, automotive computer, cell phone, personal digital assistant (PDA), game console, and so forth. Browser 104 allows computing device 102 to retrieve, via network 112, web pages 110 and display the retrieved web pages to a user(s) of device 102. Network 112 can be any of a variety of networks, including the Internet, a local area network, other public and/or proprietary networks, combinations thereof, and so forth.

One or more web pages 110 can each include one or more pieces of structured data 114. Structured data 114 is data that is in a format that is known by and expected by a consumer of the data. Structured data 114 can be formatted in accordance with known structured data standards, such as the Extensible Markup Language (XML) or HyperText Markup Language (HTML) formats. Alternatively, structured data 114 can be formatted in accordance with other public and/or proprietary standards. Whatever format is used for structured data 114, this format is known by consumers of data 114 so that data 114 can be used by such consumers, as discussed in more detail below. The amount and kind of data that constitutes a piece of structured data can vary, and is defined as part of a data type.

Different pieces of structured data 114 can be of different data types, also referred to as structured data types. A variety of different data types can be used, such as a contact type, an event type, a calendar type, a product type, a picture type, a music type, a trip type, a web page type, a geographic location type, and so forth. A data type can be defined to include any kind of data in different properties or fields, such as a date, a time, mapping coordinates, a name, a phone number, an address, a product description, a destination name, a price, and so forth. Additionally, in certain embodiments an entire page 110 can be treated as a type of structured data.

The structured data type of a particular piece of structured data can be identified in different manners. In certain embodiments, the structured data itself indicates the data type. For example, different HTML tags can be used to identify different structured data types, or a property or parameter of the structured data itself may identify the structured data type. Alternately or additionally, the structured data can be identified in different manners, such as by using header information in the page 110, or other meta data in page 110 or associated with page 110.

The structured data itself can be, but need not be, displayed to the user as part of the web page. For example, if the structured data includes various properties (e.g., the date, time, and geographic location for an event (such as a speech)), then the web page may display these properties in various parts of the web page using HTML code that is separate from the structured data. In such situations, the structured data is included in the HTML of the web page but is not displayed to the user. Alternatively, the structured data can be displayed to the user. In one or more embodiments, the structured data is displayed as part of the web page.

Additionally or alternatively, browser 104 can use the structured data in the web page to generate and display a preview of the structured data. A preview can be, for example, a window overlaying the web page that is opened when the user hovers a pointer over or near an indicator of the presence of structured data using a cursor control device (e.g., keeping the pointer within a particular distance of the indicator) for at least a threshold amount of time. This preview is generated at computing device 102; the developer of the web page need not have any knowledge of when or whether the preview is displayed. Alternatively, the developer of the web page may identify, such as within the structured data itself, which parts of the structured data should be displayed as part of the preview.

Figure 2:
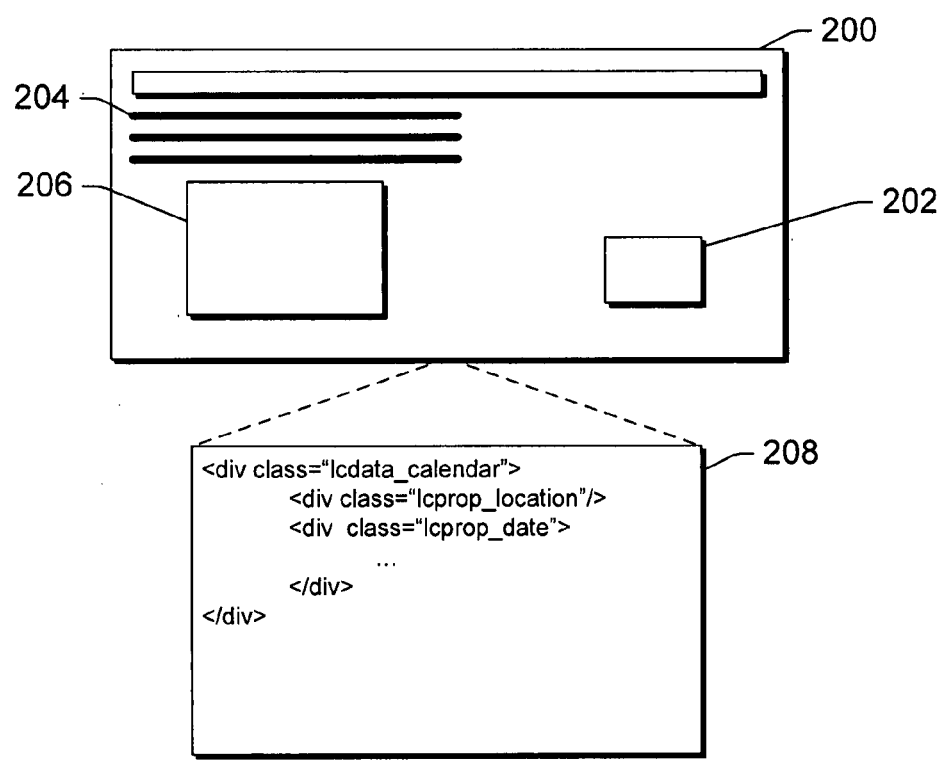
FIG. 2 illustrates an example web page that includes structured data in accordance with one or more embodiments.

FIG. 2 illustrates an example web page 200 that includes structured data in accordance with one or more embodiments. Web page 200 includes a calendar event 202 as well as additional text 204 and images 206. In this particular instance, calendar event 202 has three fields or properties—a location field and two date fields. These fields are described in the page's HTML 208 by, for example, suitable HTML tags such as the illustrated <div class="lcprop_location"/> and <div class="lcprop_date"> tags. In the example of FIG. 2, the HTML tag <div class="lcdata_calendar"> is a calendar event structured data type that is recognized by consumers as structured data.

Returning to FIG. 1, during operation, browser 104 retrieves one or more web pages 110 and presents the retrieved web pages to a user of computing device 102. Web pages 110 are typically retrieved via network 112, although alternatively may be retrieved elsewhere (e.g., from a storage device internal to computing device 102, from a removable storage device such as an optical disk or a flash memory device, and so forth). This presentation of web pages typically includes displaying the web pages on a display (not shown), but can alternatively include other presentation mechanisms, such as audio playback.

The user inputs a request, via browser 104, to collect the structured data 114 on a web page 110. Collecting structured data refers to maintaining a copy of the structured data in data store 108. This copy allows the structured data to be accessible to the user of computing device 102 even when computing device 102 is offline (e.g., is not connected to network 112, or when the server from which web page 110 was retrieved is temporarily unavailable). Typically, when the browser retrieves a web page, the web page is cached temporarily in data store 108 or alternatively some other data store. The web page is maintained in data store 108 in response to a user request to collect the web page or monitor the web page for changes. The entire web page can be stored in data store 108, or alternatively data store 108 may store the structured data and the remainder of the web page (optionally including a copy of the structured data) may be maintained in a different store.

Each web page 110 can include one or more pieces of structured data 114. For example, one piece of structured data 114 may be contact information (e.g., a phone number and address), while another piece of structured data 114 may be product or service information (e.g., airline flight arrival information). In situations where a web page 110 includes multiple pieces of structured data 114, each piece of structured data 114 can be collected separately, or alternatively the user could select to collect all pieces of structured data 114 on the web page 110.

For each piece of collected structured data 114, the collected structured data 114 as well as meta data for the structured data 114 is stored as a record 116 in data store 108. Each record 116 typically includes the structured data 114 present on the web page (or an indication of where a copy of the structured data is stored on computing device 102 or some other storage device), an identifier (e.g., a Uniform Resource Locator (URL)) of the original web page 110 from which the structured data 114 was copied, and optionally meta data describing aspects of the structured data and/or the web page identifier. Additionally, in one or more embodiments not only is the structured data 114 for the web page included in the record 116, the remaining parts of the web page are also included in the record 116.

Additionally, the user can also input a request, via browser 104, to subscribe to changes to the structured data 114. A user typically subscribes to changes to the structured data 114 when he or she desires to have the web page monitored so that he or she can be notified of any changes to the structured data. Meta data included in a record 116 indicates whether the structured data in that record has been subscribed to. When the user has subscribed to changes to the structured data 114, synchronization engine 106 accesses, at regular or irregular intervals, the original web page 110 from which the structured data 114 was copied and retrieves that web page (or alternatively just the structured data 114 from that web page). Synchronization engine 106 then compares at least the retrieved structured data 114 to the structured data that is stored as a record 116 in data store 108. If the retrieved structured data and the stored structured data are the same, then there have been no changes to the structured data. However, if the received structured data and the stored structured data are different, then there have been changes to the structured data. If there have been changes to the structured data, the received structured data replaces the stored structured data in record 116, and an indication can also be stored in the meta data for that record 116 of which parts of the structured data were changed. This allows browser 104 to identify the particular changes to the user, as discussed in more detail below.

In addition, changes to the remaining portions of the web page can be similarly detected by comparing the retrieved web page to the web page that was previously stored (e.g., as a record 116 in data store 108). If there has been a change to a portion of the web other than the web page, the retrieved web page replaces the stored web page (e.g., in data store 108). However, the user is not notified of such changes to the web page.

Data store 108 is illustrated as being part of computing device 102. It is to be appreciated that, in alternate embodiments, data store 108 or portions thereof may be part of one or more separate devices, such as a storage device directly coupled to computing device 102 or coupled to computing device 102 via network 112. Additionally, in certain embodiments data store 108 is implemented on a removable storage device, such as a nonvolatile memory device (e.g., a flash memory device), allowing users to take their data store with them and use the same store with different computing devices 102.

Figure 3:
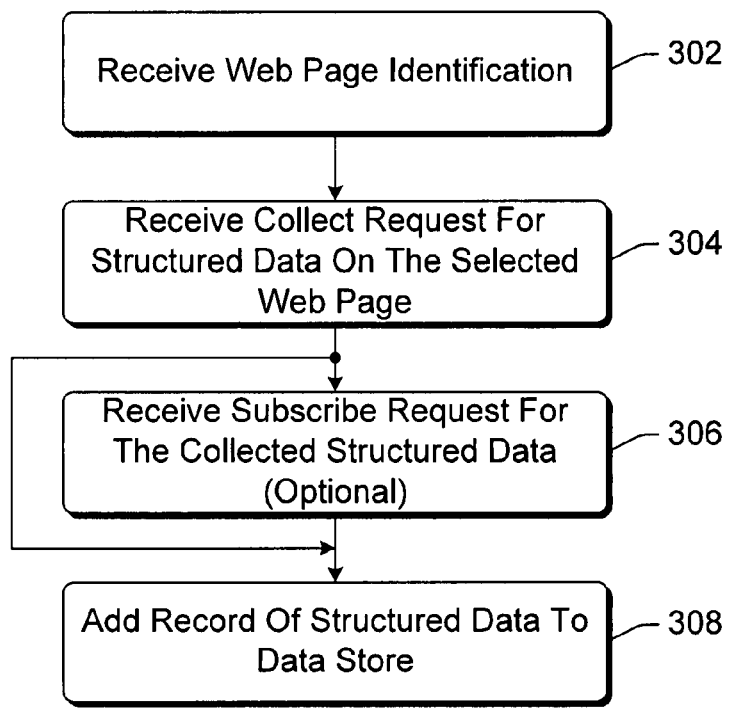
FIG. 3 is a flowchart illustrating an example process for collecting and subscribing to structured data in accordance with one or more embodiments.

FIG. 3 is a flowchart illustrating an example process 300 for collecting and as computing device 102 of FIG. 1, and can be implemented in software, firmware, hardware, or combinations thereof. In certain embodiments, process 300 is implemented by a suitably configured browser 104 of FIG. 1.

Initially, an identification of a web page is received (act 302). The web page can be identified in different manners. In one or more embodiments, the web page selection can be received in any of a variety of conventional manners using a browser of the computing device. For example, the user can enter a URL of the web page, the user can select a link from another web page, and so forth. In other embodiments, structured data and an identifier of the web page from which the structured data can be obtained is received in some other manner, such as being received as a file or other text description separate from navigation of the Internet using a browser. For example, a file containing structured data may be received, and the URL of the web page on which that structured data resides may be included in the structured data, may be included elsewhere in the file, may accompany the file, and so forth.

A collect request for structured data on the selected web page is also received (act 304). Receipt of the collect request indicates that the user desires to collect the structured data, typically for offline use. The user may desire to collect the structured data for different reasons, such as to maintain an offline copy of the structured data, to allow the user to subsequently see a preview of the structured data without requiring him or her to navigate to the web page, and so forth. The collect request can be received in any of a variety of manners. For example, the user may select an on-screen button, select an option from a pull-down menu, input text in a data entry field, input a voice command via a microphone, and so forth. Additionally, receipt of the web page identification in act 302 may serve as an inherent collect request for the structured data on that web page.

In certain embodiments, a collect behavior is associated with each structured data type. A behavior is a description of a way that structured data can be used, typically to provide a service to the user of computing device 102. A behavior typically resides in the form of software instructions and data or code that is executed by computing device 102, although a behavior may alternatively be implemented in different manners (such as in firmware and/or hardware). The collect behavior is programmed or otherwise configured to know how to interact with browser 104. When the collect request is received, the collect behavior indicates to the browser 104 that the user desires to collect the structured data.

The collect behavior can be installed on computing device 102 using any of a variety of different techniques that can commonly be used to transfer instructions and data to a computing device. Installing the behavior on computing device 102 refers to downloading the instructions and data for the behavior to computing device 102 and configuring computing device 102 as necessary so that computing device 102 can execute the instructions and data. For example, a user of device 102 can navigate, using browser 104, to a particular web page 110 that allows a behavior to be installed. Such a web page 110 includes the instructions and data that can be downloaded and executed as the behavior, or alternatively includes a link to such instructions and data. By way of another example, the collect behavior may be pre-installed on computing device 102 so that the collect behavior is immediately available to the user when he or she first uses computing device 102.

When a web page including structured data is displayed via the browser, any behaviors associated with the structured data type are made available for selection by the user. As the collect behavior is associated with all structured data types, the collect behavior is made available for selection by the user. The collect behavior can be made available in any of a variety of manners. In some embodiments, the collect behavior is displayed in a drop-down list when the web page is displayed, or displayed in a drop-down list or other preview window when the user navigates a cursor over or near a display of the structured data on the web page. In other embodiments, the collect behavior is displayed as an option when the user right-clicks (e.g., using the right button of a mouse cursor control device) while the cursor or pointer is on or near a display of the structured data on the web page or alternatively whenever the web page is displayed, or displayed as an icon or other button in the frame of a window (e.g., in a taskbar or elsewhere in the frame), and so forth.

In one or more embodiments, a visual indicator is displayed on the web page to indicate the presence of structured data, and a preview window overlaying the web page is displayed when the user hovers a pointer over or near the visual indicator for at least a threshold amount of time. In such embodiments, the preview window displays at least some of the structured data as well as a collect button which can be selected by the user (e.g., by navigating the pointer over the option and "clicking" on the button using a cursor control device (e.g., a mouse)). Selection of the collect button causes the collect behavior to be invoked. Additionally, in certain embodiments the favorites list is organized into multiple categories. In such embodiments, selection of the collect button further causes options to be presented to the user allowing the user to select to which of multiple categories or collections the link to the structured data is to be added.

A subscribe request for structured data on the selected web page is also optionally received (act 306). When the subscribe request is received, it indicates to the browser that the user desires to subscribe to changes to the structured data, so that the user is notified of any changes to the structured data. The subscribe request can be received in any of a variety of manners, analogous to the collect request discussed above with respect to act 304. In certain embodiments, a subscribe behavior is associated with each structured data type, and a subscribe button is displayed in the preview window along with the collect button. Additionally, receipt of the web page identification in act 302 may serve as an inherent subscribe request for the structured data on that web page.

A record of the structured data is added to the data store (act 308). This record typically includes the structured data present on the web page (or an indication of where a copy of the structured data is stored on computing device 102 or some other storage device), an identifier of the original web page from which the structured data was copied, and optionally meta data describing aspects of the structured data and/or the web page identifier. When the structured data is subscribed to, the meta data included in the record in act 308 includes an indication that the structured data has been subscribed to. Additionally, in one or more embodiments the remainder of the web page besides the structured data is also added to the data store.

Alternatively, in certain embodiments act 304 is inherent in act 306. In such embodiments, an explicit collect request would not be received, but a subscribe request would be received. Receipt of the subscribe request operates as an inherent collect request, as the structured data would be both collected and subscribed to.

As can be seen from process 300, a user can collect structured data and also can subscribe to the collected structured data. Collection of the structured data copies the structured data to the computing device (or storage device coupled to the computing device). Subscription to the structured data causes the computing device (e.g., synchronization engine 106 of FIG. 1) to subsequently access the web page and check whether the structured data has been changed.

Figure 4:
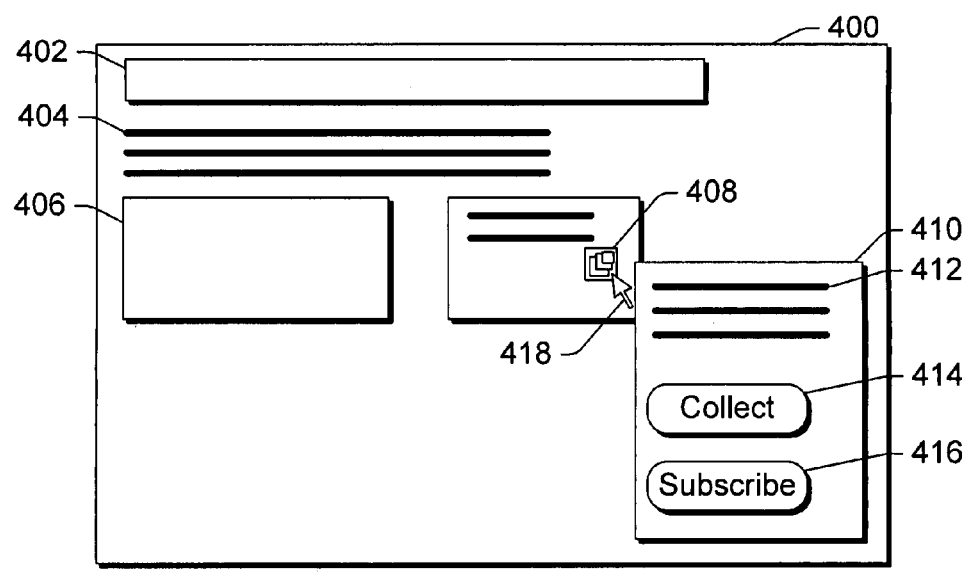
FIG. 4 illustrates an example user interface allowing structured data to be collected and subscribed to in accordance with one or more embodiments.

FIG. 4 illustrates an example user interface allowing structured data to be collected and subscribed to in accordance with one or more embodiments. In FIG. 4, a web page 400 is illustrated that includes a title 402 and various text 404 and images 406. The web browser detects structured data on web page 400, and displays a visual indicator 408 that indicates the presence of structured data on web page 400. When visual indicator 408 is selected by the user, a preview window 410 of the structured data is displayed. Preview window 410 includes the structured data 412, as well as a collect button 414 and a subscribe button 416. Collect button 414 can be selected by the user to make a collect request, and subscribe button 416 can be selected by the user to make a subscribe request. The user can select collect button 414 and subscribe button 416 in different manners, such as by navigating pointer 418 over and clicking on button 414 or button 416.

Web page 400 is illustrated with a preview window 410 including both collect button 414 and subscribe button 416. Alternatively, only one of buttons 414 and 416 may be displayed in preview window 410, in which case only one of the collect or subscribe functionality may be made available to the user.

Figure 5:
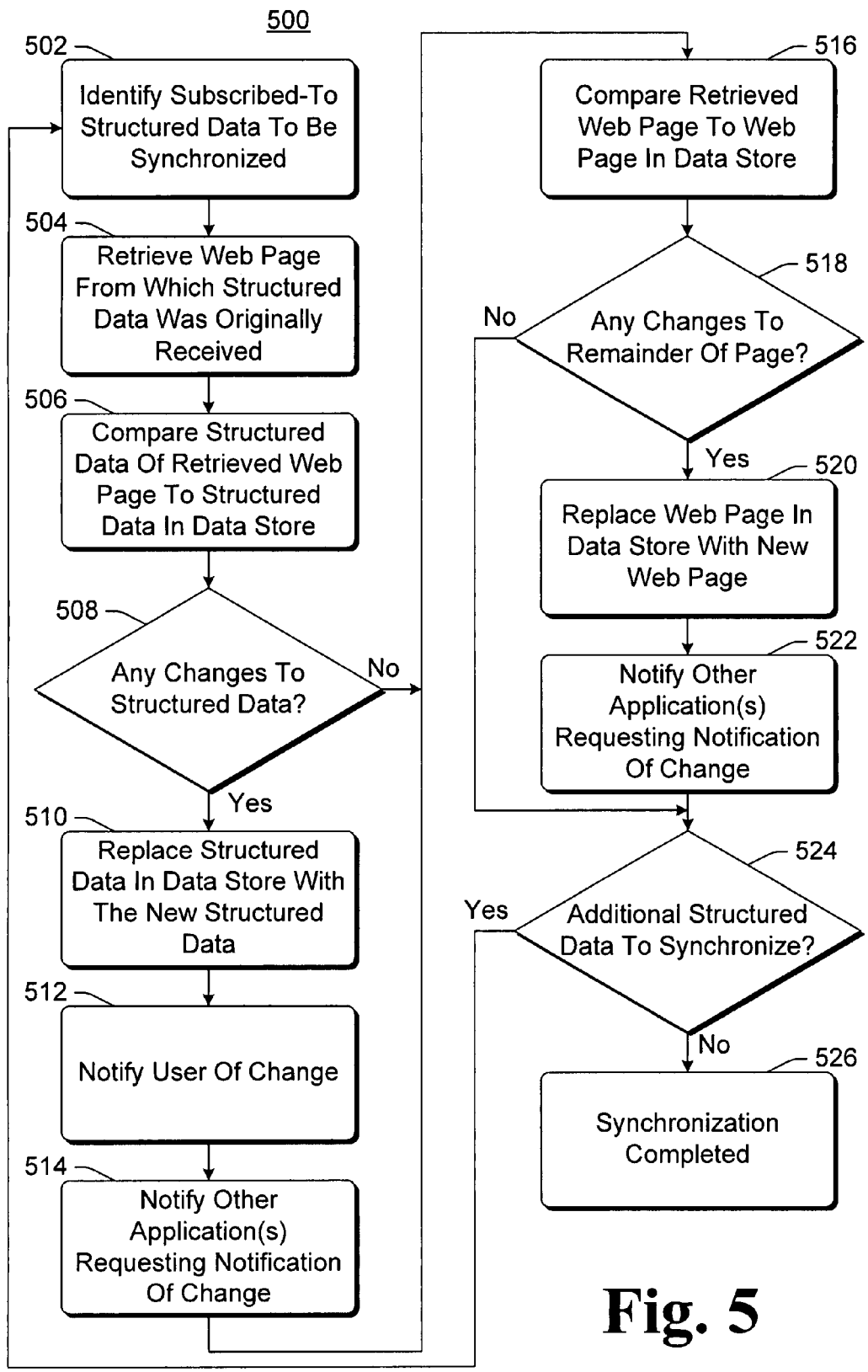
FIG. 5 is a flowchart illustrating an example process for synchronizing structured data in accordance with one or more embodiments.

FIG. 5 is a flowchart illustrating an example process 500 for synchronizing structured data. Process 500 is carried out by a computing device, such as computing device 102 of FIG. 1, and can be implemented in software, firmware, hardware, or combinations thereof. In certain embodiments, process 500 is implemented by a suitably configured synchronization engine 106 of FIG. 1. Process 500 is performed each time subscribed-to data is to be synchronized.

Initially, structured data that has been subscribed to that is to be synchronized is identified (act 502). How frequently a particular piece of structured data is synchronized can vary. In certain embodiments, the structured data itself includes a property identifying how frequently it is to be synchronized. In other embodiments other mechanisms are used to determine the frequency, such as a user may input how frequently he or she would like the synchronizing to occur, particular frequencies may be associated with different structured data types, and so forth. The synchronization may be at regular intervals (e.g., once per day, once per hour, once every five minutes, and so forth), or at irregular intervals (e.g., once per day in the days leading up to a particular time and date identified in the structured data, once per hour on the same date as identified in the structured data, and once every five minutes on the same date as identified in the structured data and in the hour immediately preceding a time as identified in the structured data). The synchronization may also be performed manually by an application. For example, an application using the structured data may invoke synchronization engine 106 of FIG. 1 to synchronize the structured data so that the application knows it is using the most recent version of the structured data.

The web page from which the structured data was originally received is retrieved (act 504). This web page is identified in the record of the collected structured data (e.g., in data store 108 of FIG. 1). Typically the entire web page is retrieved in act 504, although alternatively only the portion of the web page that includes the structured data need be retrieved. The web page retrieved in act 504 is typically retrieved over network 112 of FIG. 1, and is typically the original source of the web page (or was identified as the source of the web page when the structured data was received). For example, the web page retrieved in act 504 is oftentimes the web page that was displayed when the structured data was subscribed to. Alternatively, the web page in act 504 may not be the web page from which structured data was originally received, but rather a web page identified by the subscribed-to structured data as the web page from which updates to the structured data should be retrieved.

The structured data in the retrieved web page from act 504 is then compared to the structured data previously stored in the data store (act 506). Given the comparison, a check is made as to whether there are any changes to the structured data (act 508). A change to the structured data could be the addition of some data to the structured data, a deletion of some data from the structured data, and/or a modification of data in the structured data. If there are no changes to the structured data, then process 500 proceeds to compare the remainder of the retrieved web page to the web page in the data store (act 516), as discussed in more detail below.

Returning to act 508, if there are changes to the structured data then the structured data in the data store is replaced with the structured data from the web page retrieved in act 504 (act 510). The user is also notified of the change to the structured data (act 512). Typically, the user is notified of the change to the structured data by creating or altering the appearance of a link to the structured data or the web page. In certain embodiments, the user has a list of links (e.g., titles, names, icons, other identifiers, etc.) of the structured data to which he or she is subscribed, such as a favorites list or a bookmark list. The user may also have a history list that is a list of links to web pages that the user has previously visited. The user is notified of a change to one of these pieces of structured data by changing the appearance of the link in the list (e.g., displaying the link bold-faced if there's a change to the structured data and non-bold-faced if there is no change, displaying the link in a different color if there is a change to the structured data, and so forth).

Alternatively, the user can be notified of changes to the structured data separately from the favorites list, bookmark list, or history list. For example, a link to the structured data can be presented to the user in another portion of the browser window (e.g., in a links toolbar, immediately above or below an address line, next to a menu bar, and so forth). The appearance of such a link can be altered to serve as the notification to the user (e.g., a border around the link may be changed, a color of the link may be changed, and so forth). By way of another example, the links in another portion of the browser window (e.g., in a links toolbar, immediately above or below an address line, next to a menu bar, and so forth) may be only those links for which the structured data on the linked-to web page has changed. For example, a link may be added to a links toolbar when the structured data on the web page that is linked to by that link changes, and may then be removed from the links toolbar when the changed structured data has been displayed to the user.

A record of the status of the structured data is also updated to reflect that the structured data has been changed. This status record can be maintained in data store 108 of FIG. 1, for example as part of the meta data for the structured data. Alternatively, this record may be stored elsewhere, such as maintained in a data structure of synchronization engine 106 or browser 104, a storage location other than data store 108, and so forth. This record is updated when the changed structured data is presented to the user, so that the user is no longer notified of the change.

Additionally, the user may be notified of other information regarding the web page or structured data along with, or in place of, the notification of act 512. For example, a link may be expired (as discussed in more detail below), and the user can be notified of that expiration. By way of another example, a web page or structured data may have an error (e.g., the server or web page may no longer be available), and the user can be notified of that error. By way of yet another example, a link may be outdated (e.g., the web page has not been accessed for a threshold duration, the structured data on the web page has not been previewed for a threshold duration, and so forth), and the user can be notified that it is outdated.

Additionally, one or more other applications may request notification of changes to the structured data and/or the web page (act 514). Other applications executing on the same computing device as the synchronization engine, or alternatively on another computing device, may register with the synchronization engine as desiring notification of changes to the structured data, and these applications are notified in act 514. For example, an address book application may register with the synchronization engine to receive notifications of changes to any structured data, or alternatively to receive notifications of changes to structured data of a particular type (e.g., a contact data type). Thus, if a change to a particular contact's phone number were to be detected by the synchronization engine, then the synchronization engine notifies the address book application so that it can display the new phone number for that contact. These applications may also update a record of the status of the structured data if this changed data is presented to the user so that the user is no longer notified of the change.

Additionally, the remainder of the web page retrieved in act 504 may also be compared to the remainder of the web page previously stored (e.g., along with the structured data for the web page) to identify changes to portions of the web page other than to the structured data (act 516). Given the comparison, a check is made as to whether there are any changes to the remainder of the web page (act 518). If there are no changes to the remainder of the web page, then process 500 proceeds to check whether there is any additional structured data to synchronize (act 524). If there are additional changes, then the web page in the data store is replaced with the new web page (act 520).

Additionally, any applications that have requested to be notified of changes to the web page are notified of the changes (act 522). This notification is analogous to that in act 514 discussed above. Process 500 then proceeds to check whether there is any additional structured data to synchronize at this time (act 524). If there is additional structured data to be synchronized at this time, then process 500 returns to act 502 to identify a piece of structured data to be synchronized. If there is no additional structured data to be synchronized at this time, the synchronization process is completed (act 526).

Thus, as can be seen in FIGS. 3 and 5, a user is able to subscribe to particular structured data on a web page. The user is notified of any changes to that structured data, but is not notified of other changes on the web page. Other applications may be notified of other changes on web page, but the user is not troubled with notification of such changes.

Additionally, it should be noted that in certain embodiments the user may not be notified of changes to structured data in certain situations. For example, if the user subscribes to structured data that is expected to constantly change, such as a stock quote, then the user may not be notified of a change. Rather, the changed structured data is retrieved from the web page and is made available to the user as a preview when desired, but the user is not notified of the change. The browser can determine that the user should not be notified of changes to certain structured data based on the particular structured data type, based on a property of the structured data itself, based on meta data associated with the structured data in the data store, and so forth.

Figure 6:
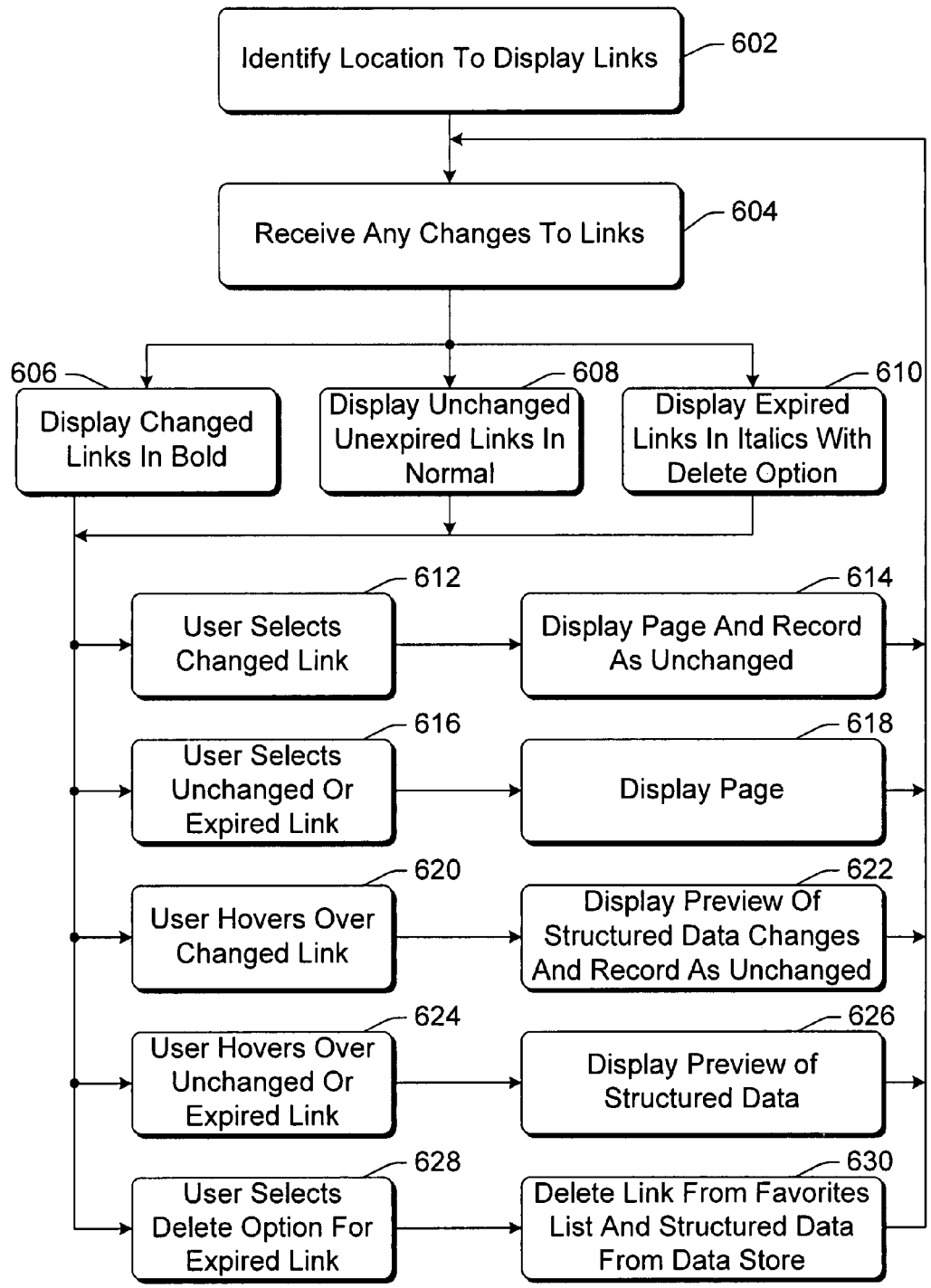
FIG. 6 is a flowchart illustrating an example process for performing at least some link management using structured data in accordance with one or more embodiments.

FIG. 6 is a flowchart illustrating an example process 600 for performing at least some link management using structured data. Process 600 is carried out by a computing device, such as computing device 102 of FIG. 1, and can be implemented in software, firmware, hardware, or combinations thereof. In certain embodiments, process 600 is implemented by a suitably configured browser 104 of FIG. 1.

Initially, a location to display links to web pages is identified (act 602). Different locations can be used, such as a favorites or bookmark list, a links toolbar in the browser, another location in the window in which the browser user interface is displayed, another window overlaying or next to the window in which the browser user interface is displayed, and so forth. In one or more embodiments, the browser uses a default location that can optionally be overridden by the user. Additionally, any changes to the linked to web pages are identified (act 604). These can be identified, for example, as discussed above with reference to FIG. 5.

The links that will be displayed can be stored in different locations, such as data store 108 of FIG. 1, another store on computing device 102, a store on another remote computing device and so forth. The links can be displayed in a variety of different forms, such as icons, titles, identifiers from the web page or structured data in the web page, and so forth. The links are displayed in different manners based on whether the structured data that has been subscribed to has been changed or has expired. An expired link refers to a link that is detected (e.g., by browser 104 of FIG. 1) as being not important any more. Typically, structured data that has a date and/or time associated with it becomes expired when that date and/or time has passed. For example, if event structured data describes an airline flight that is scheduled to arrive at 3:00 pm on Apr. 15, 2007, then the link to that structured data can be identified as expired after 3:00 pm on Apr. 15, 2007, or after some grace period (e.g., one or a few hours) after 3:00 pm. By way of another example, if that same airline flight structured data had a property indicating whether the flight has arrived, then the structured data can be identified as expired after the flight has arrived.

If the structured data has been changed, then the link is displayed in a bold font style (act 606) or is otherwise highlighted. If the structured data has not been changed and has not expired, then the link is displayed in a normal font style (act 608). If the structured data has expired, then the link is displayed in a grey font color with a delete option (act 610) or is otherwise displayed to differentiate it from non-expired links. If a web page has no structured data, or the structured data has been collected but not subscribed to, then the link is displayed the same as for unchanged data (in a normal font style, act 608).

Process 600 can then receive different user inputs and perform different operations based on the received input. The user can select one of the links or can hover over one of the links. The user can select one of the links in a variety of different manners, such as by navigating the pointer over a display of the link and "clicking" on the link using a cursor control device (e.g., a mouse). The user can hover over one of the links by navigating the pointer over a display of the link and leaving the pointer over the link for at least a threshold amount of time.

If the user selects a changed link (act 612), then the linked-to page is displayed and the link is recorded as being unchanged (act 614). The link is recorded as being unchanged because the web page has been displayed to the user, so he or she has had the opportunity to see the changes. Recording the link as unchanged includes updating the status record of the structured data to reflect that the structured data is no longer changed.

If the user selects an unchanged link or an expired link (act 616), then the linked-to page is displayed (act 618). No change in the status of the structured data (if any) need be made.

If the user hovers over a changed link (act 620), then a preview of the changes to the structured data is displayed and the link is recorded as being unchanged (act 622). The link is recorded as being unchanged because a preview of the structured data has been displayed to the user, so he or she has had the opportunity to see the changes. The preview of the structured data can be displayed in a variety of different manners. In certain embodiments, a window is displayed next to the link in the favorites list, and the structured data on the linked-to page that has changed is displayed in the window. Alternatively, some or all of the structured data that has not changed may be displayed in the window. This structured data is typically retrieved from data store 108 of FIG. 1, so the web page that includes the structured data need not be retrieved. This provides a quick and easy way for the user to preview the changes to the structured data without having to navigate to the linked-to web page.

The part of the structured data that has changed can be called out in the preview, such as by displaying the changed data in a different color, in a different font style, in a highlighted format, and so on. For example, assume that a piece of structured data includes a description of a product and a price for the product. If the price changes but no other part of the structured data changes, then the preview can display the price in a different color (or highlighted, or in a bold font style, etc.) to bring it to the user's attention.

Additionally, the information displayed in the preview in act 622 can vary. In certain embodiments, the structured data itself identifies which information is to be displayed in the preview. In other embodiments, different structured data types are associated with different preview formats, and the information displayed in the preview is in accordance with the preview format for the structured data type. In still other embodiments, default information is displayed in the preview, such as a title, a thumbnail image, and any data that has changed. In yet other embodiments, the browser makes a best guess as to which information to include in the preview, such as the first image and the first few properties of the structured data (the number of properties used can vary, for example, based on the available space for the preview window).

If the user hovers over an unchanged or expired link (act 624), then a preview of the structured data is displayed (act 626). This preview is analogous to the preview in act 622, except that no indication of any changed data would be included as there is no changed structured data to display in act 626. In situations where the user hovers over a link that has no structured data, a screenshot of the page (or part of the page) is displayed in the preview window. Alternatively, in such situations different information can be displayed in the preview window, such as the first image(s) on the web page, the first text field(s) on the web page, and so forth. The information displayed in the preview window is obtained by the browser when the web page is added as a favorite.

If the user selects the delete option displayed with an expired link (act 628), then the expired link is deleted from the favorites list and the subscribed-to structured data is deleted from the data store (act 630). Selection of the delete option deletes the link, so it is no longer displayed to the user and the structured data is no longer collected or subscribed to.

Figure 7:
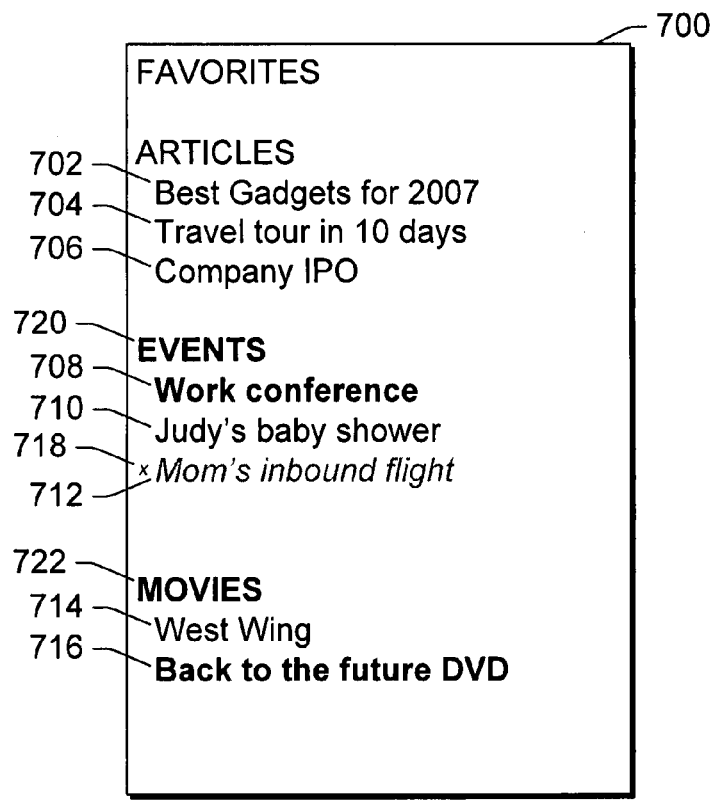
FIG. 7 illustrates an example user interface illustrating a favorites list in accordance with one or more embodiments.

FIG. 7 illustrates an example user interface illustrating a favorites list in accordance with one or more embodiments. In FIG. 7, a favorites list 700 is illustrated with multiple links 702, 704, 706, 708, 710, 712, 714, and 716. Each link 702-716 identifies a favorite or bookmarked link of the user. Additionally, in the example of FIG. 7, the links 702-716 are organized into different categories or collections, illustrated as "Articles", "Events", and "Movies". These different category or collection names can be assigned automatically based on the structured data type. In one or more embodiments, each structured data type corresponds to a different category or collection name. In other embodiments, these different category or collection names are assigned by the user, and links can be assigned to these categories or collections by the user when the links are collected or subscribed to. Additionally or alternatively, an organization option may be included to allow the user to organize links into different categories or collections after they have been collected, and/or to allow the user to move links from one category or collection to another.

In the illustrated example, links 702, 704, 706, 710, and 714 are unchanged and illustrated in normal font style. Links 708 and 716 are changed and illustrated in bold font style, and link 712 is expired and illustrated in a grey font color. A delete option 718 is displayed next to link 712, selection of which allows link 712 to be deleted. In the illustrated example, each category or collection that has assigned to it a link that has changed also has its appearance changed. Accordingly, the collection identifiers 720 ("EVENTS") and 722 ("MOVIES") are displayed in bold font style. The collection identifiers can be changed in the same manner as the links are, or alternatively in different manners. Alternatively, only the links may be changed but not the collection identifiers.

When using collection identifiers, the links and collection identifiers are displayed so that the links are visually associated with the collection identifiers. This visual association is illustrated in FIG. 7 as the links being below and indented. Alternatively, the links may be visually associated with the collection identifiers in other manners, such as by color, by font size, by font type, with additional framing or borders, with lines showing links, and so forth.

Figure 8:
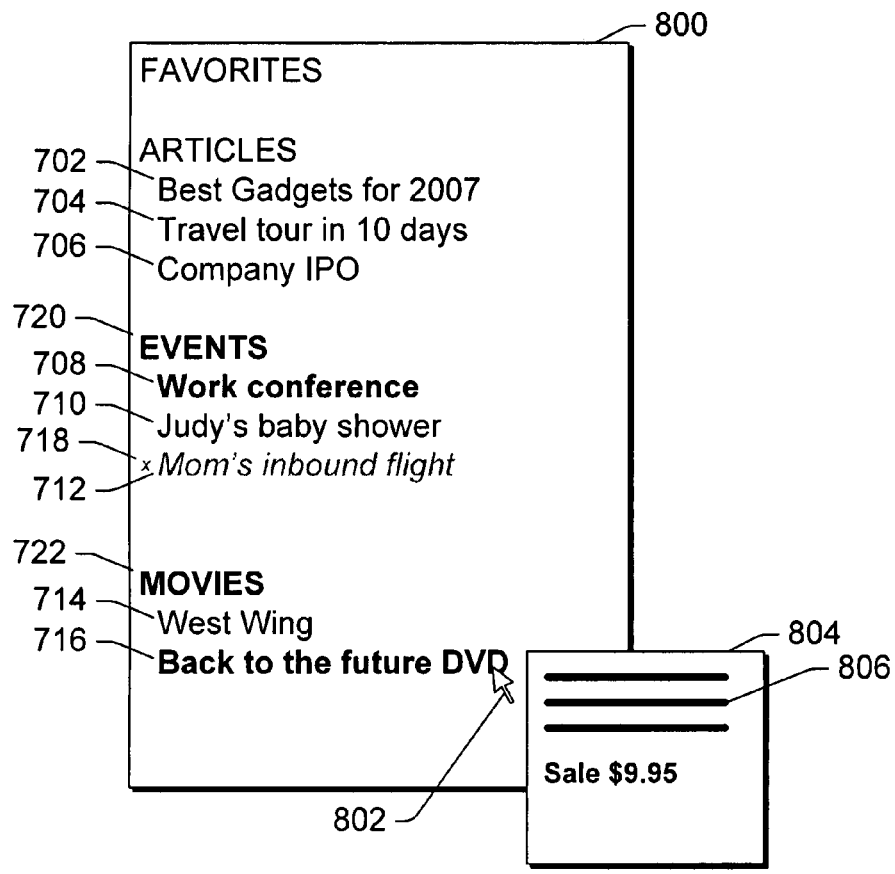
FIG. 8 illustrates another example user interface illustrating a favorites list in accordance with one or more embodiments.

FIG. 8 illustrates another example user interface illustrating a favorites list in accordance with one or more embodiments. The user interface in FIG. 8 is analogous to the user interface in FIG. 7, although in FIG. 8 the user has hovered over the link 716 with pointer 802. In response to the hovering over the changed link, a preview window 804 is displayed, including the subscribed-to structured data. The sale price of $9.95 is presented to the user, along with additional unchanged portions of the structured data 806. The price of $9.95 is illustrated in a bold font style to indicate that it has changed.

Once the user is no longer hovering over link 716, the preview window 804 is no longer displayed and the link 716 is recorded as unchanged. Once recorded as unchanged, link 716 will be displayed in a normal font style.

In the process of FIG. 6 and the user interfaces of FIGS. 7 and 8, unchanged links are discussed as being displayed in a normal font style, changed links are discussed as being displayed in a bold font style, and expired links are discussed as being displayed in a grey font color. It is to be appreciated, however, that the links are displayed in different manners so that the user can visually detect whether a link has been changed, is unchanged, or has expired by looking at the link. Different mechanisms can alternatively be used to display links as changed, unchanged, or expired. For example, different colors could be used, different fonts could be used, different font sizes could be used, different borders could be used, sub-categories could be created (e.g., sub-categories of "changed", "unchanged", and "expired" could be created under "Articles" in FIGS. 7 and 8), and so forth.

Additionally, in the user interfaces of FIGS. 7 and 8, a preview of structured data is displayed when a user hovers over a link in a favorites list. It is to be appreciated that an analogous preview can be displayed to the user in situations where the link is displayed separately from the favorites list, such as in a links toolbar. The browser responds to the user hovering a pointer over this identifier in the same manner as discussed above, and the preview is displayed as discussed above.

Figure 9:
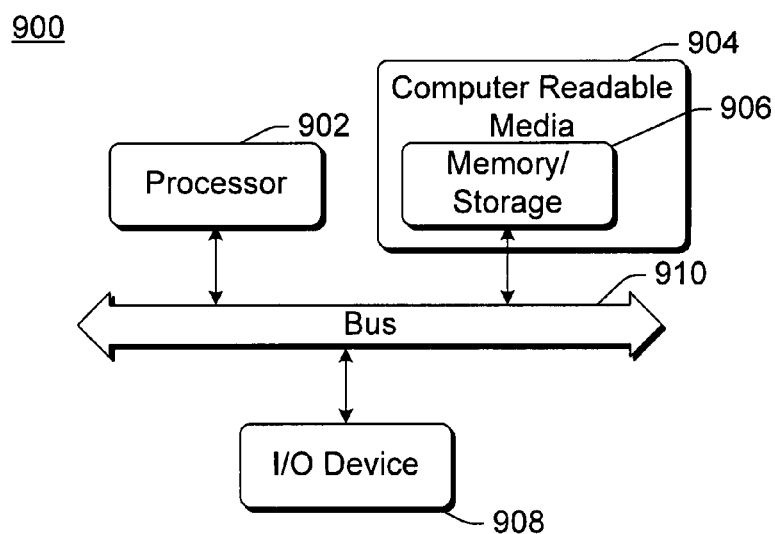
FIG. 9 illustrates an example computing device that can be configured to implement the managing web page links using structured data in accordance with one or more embodiments.

FIG. 9 illustrates an example computing device 900 that can be configured to implement the managing web page links using structured data in accordance with one or more embodiments. Computing device 900 can be, for example, computing device 102 of FIG. 1.

Computing device 900 includes one or more processors or processing units 902, one or more computer readable media 904 which can include one or more memory and/or storage components 906, one or more input/output (I/O) devices 908, and a bus 910 that allows the various components and devices to communicate with one another. Computer readable media 904 and/or I/O device(s) 908 can be included as part of, or alternatively may be coupled to, computing device 900. Bus 910 represents one or more of any of several types of bus structures, including a memory bus or memory controller, a peripheral bus, an accelerated graphics port, and a processor or local bus using any of a variety of bus architectures. Bus 910 can include wired and/or wireless buses.

Memory/storage component 906 represents one or more computer storage media. Component 906 can include volatile media (such as random access memory (RAM)) and/or non-volatile media (such as read only memory (ROM), Flash memory, optical disks, magnetic disks, and so forth). Component 906 can include fixed media (e.g., RAM, ROM, a fixed hard drive, etc.) as well as removable media (e.g., a Flash memory drive, a removable hard drive, an optical disk, and so forth).

One or more input/output devices 908 allow a user to enter commands and information to computing device 900, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon instructions that, responsive to execution by a computing device, cause the computing device to:

receive an identification of which one or more portions of a web page include structured data that can be subscribed to, the web page including structured data as well as other non-structured data portions, the structured data including a parameter identifying the structured data;

display a visual indication of which of the one or more portions can be subscribed to, the visual indication comprising an icon;

receive a request to collect structured data in the web page;

receive a request to subscribe to the structured data;

display a link identifying the web page;

store the structured data in a data store for offline use of the structured data; and responsive to storing the structured data in the data store:

retrieve a current version of the web page;

compare the retrieved web page to a previously stored version of the web page;

detect that the web page has changed if the current version of the web page and the previously stored version of the web page are not the same; and notify a user of the computing device that the web page has changed only if the structured data in the web page has changed, the instructions further configured to:
display the link in a first manner if the structured data in the web page has changed;
display the link in a second manner if the structured data in the web page has expired;
display the link in a third manner if the structured data in the web page has not changed and has not expired; and
display the link in a fourth manner if the structured data has an error.

2. The one or more computer storage media as recited in claim 1, wherein the instructions further cause the computing device to:
perform the retrieval, comparison, and detection at a frequency based at least in part on a data type of the structured data.

3. The one or more computer storage media as recited in claim 1, wherein to store the structured data is to store the structured data on a removable storage device of the computing device.

4. The one or more computer storage media as recited in claim 1, wherein the instructions further cause the computing device to:
display a preview of the structured data in response to a pointer hovering over the link.

5. The one or more computer storage media as recited in claim 1, wherein to receive the request to collect structured data is to:
display a collect button along with the web page; and
receive a user selection of the collect button.

6. A method, implemented in a computing device, the method comprising:
displaying a plurality of user-selectable links, each user-selectable link identifying a different one of a plurality of web pages; and
altering how at least one user-selectable link of the plurality of user-selectable links is displayed as changes to structured data in the different one of the plurality of web pages are detected, the altering including an ability to:
alter the at least one user-selectable link in a first manner to indicate content associated with the structured data has changed;
alter the at least one user-selectable link in a second manner to indicate the structured data in the different one of the plurality of web pages has expired; and
alter the at least one user-selectable link in a third manner if the structured data has an error;
wherein at least some web pages having changes to corresponding structured data are still accessible via an associated link, each user-selectable link configured to enable navigation to the different one of the plurality of web pages.

7. The method as recited in claim 6, the displaying comprising displaying the plurality of user-selectable links in a favorites list.

8. The method as recited in claim 6, the displaying comprising displaying one or more of the plurality of user-selectable links in a links toolbar.

9. The method as recited in claim 6, further comprising:
displaying a preview of changed structured data in one of the plurality of web pages in response to detecting a pointer hovering over a user-selectable link identifying the one web page.

10. The method as recited in claim 6, the first manner comprising a bold font style, the second manner comprising a grey font color, and the third manner comprising a normal font style.

11. The method as recited in claim 6, the displaying comprising displaying the plurality of user-selectable links organized so that each of the plurality of user-selectable links is visually associated with one of a plurality of collection identifiers, and further comprising altering how the plurality of collection identifiers are displayed as changes to structured data in the plurality of web pages are detected.

12. One or more computer storage media having stored thereon instructions that, responsive to execution by a computing device, are configured to:
receive an identification of which one or more portions of a web page include structured data that can be subscribed to, wherein the identification of a portion that is structured data is included as part of the structured data;
display one or more user-selectable visual indicators configured to indicate each of the one or more portions that can be subscribed to;
receive a request to collect structured data in the web page;
receive a request to subscribe to the structured data;
store the structured data in a data store for offline use of the structured data;
detect a change to the web page by retrieving the structured data and comparing the retrieved structured data to said stored structured data, wherein, responsive to comparing said retrieved structured data to said stored structured data, the instructions are further configured to:
display a link identifying the web page in a first manner if the structured data in the web page has changed;
display the link associated with the web page in a second manner if the structured data in the web page has expired;
display the link associated with the web page in a third manner if the structured data in the web page has not changed and has not expired; and
display the link associated with the web page in a fourth manner if the structured data has an error; and
notify a user of a change to the web page only if the change is a change to the structured data and not a change to other portions of the web page.

13. The one or more computer storage media as recited in claim 12, wherein the instructions are further configured to display a preview of the structured data in response to detecting a pointer hovering over the link identifying the web page.

14. The one or more computer storage media as recited in claim 13, wherein the instructions are further configured to mark a status of the structured data as unchanged in response to detecting the pointer hovering over the link.

15. The one or more computer storage media as recited in claim 12, wherein to notify the user of the change is to change a display of a link identifying the web page in a link toolbar.

16. The one or more computer storage media as recited in claim 12, wherein instructions are further configured to:
detect that the structured data has expired;
notify the user that the structured data has expired; and
display a delete option with an identifier of the web page.

17. The method as recited in claim 6, the method further comprising polling each of the different one of the plurality of web pages at regular intervals effective to determine changes to the structured data in the different one of the plurality of web pages.

18. The one or more computer storage media as recited in claim 5, wherein responsive to receiving the user selection of the collect button, the instructions are further configured to:
- display one or more selectable categories;
- receive a user selection of one of the one or more selectable categories; and
- add a link associated with the collected structured data to a collection of links associated with the selected category.

19. The one or more computer storage media as recited in claim 1, wherein the instructions are further configured to:
- receive one or more updates to the structured data from a different web page than the web page including the structured data.

20. The one or more computer storage media as recited in claim 1, the instructions further configured to:
- responsive to receiving the request to subscribe to the structured data, receive one or more updates associated with the structured data; and
- forward the one or more updates to one or more applications.

\* \* \* \* \*